Patented Oct. 30, 1928.

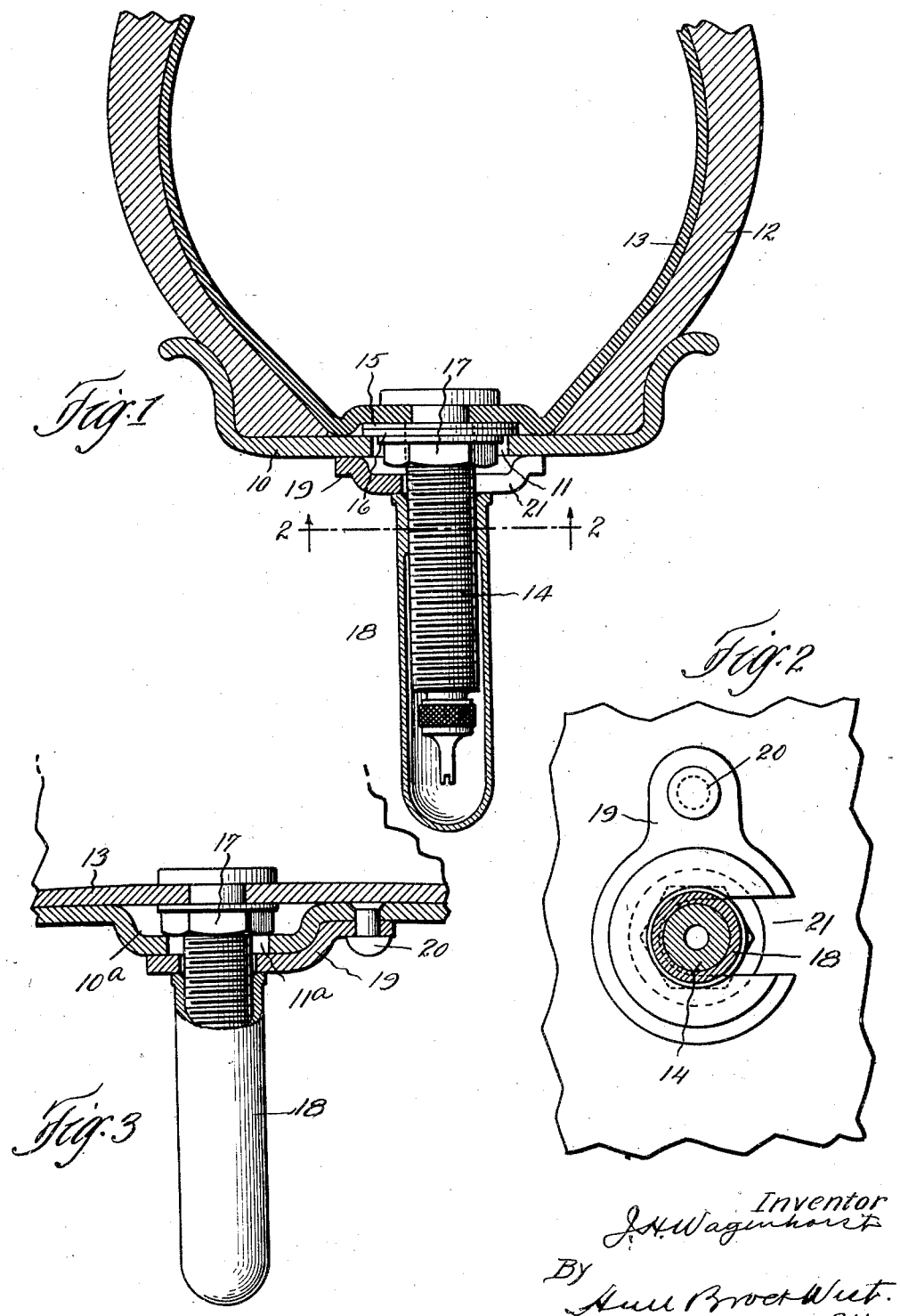

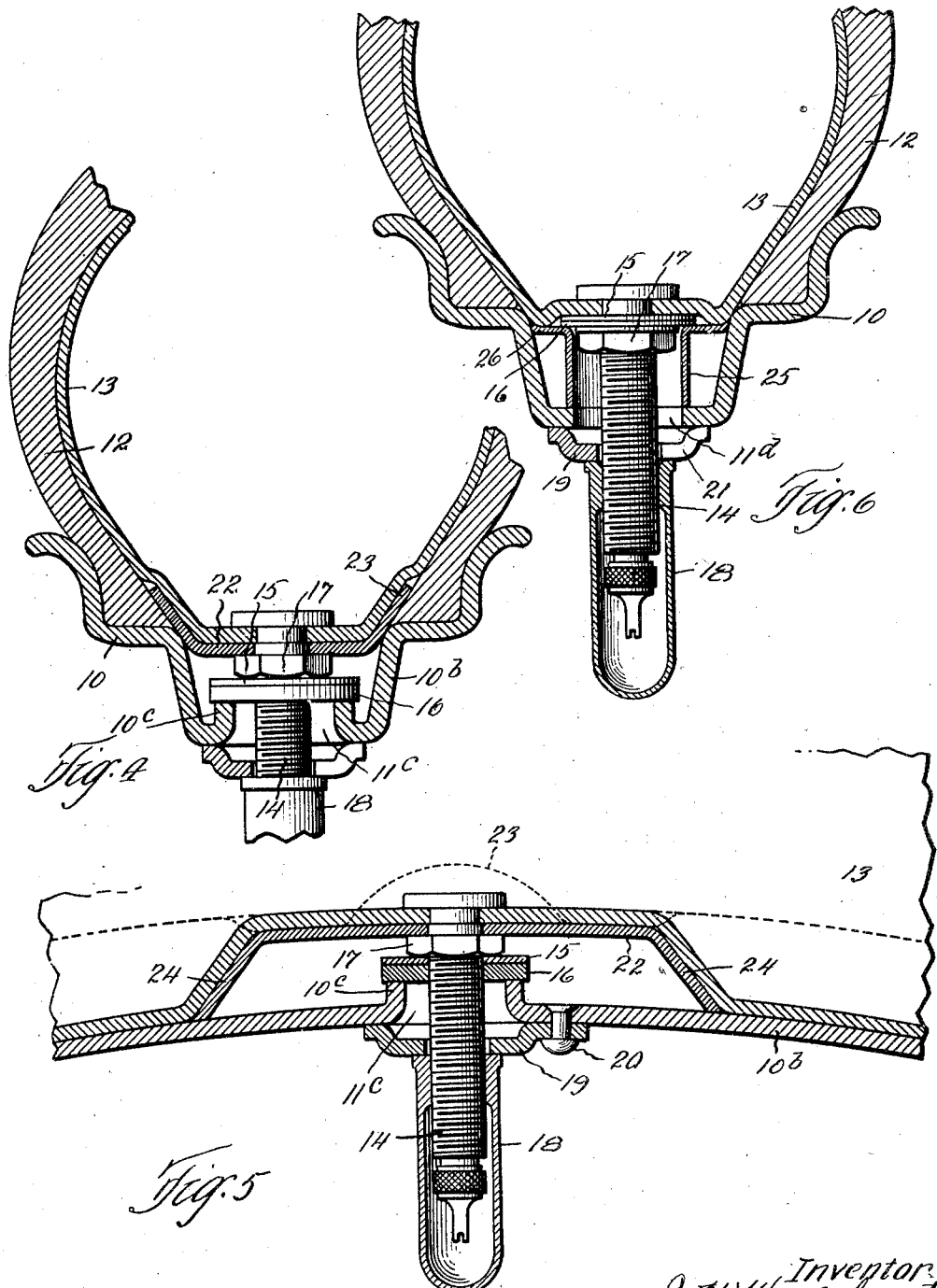

1,689,649

UNITED STATES PATENT OFFICE.

JAMES H. WAGENHORST, OF JACKSON, MICHIGAN.

RIM WITH VALVE-STEM FASTENER.

Application filed January 26, 1925. Serial No. 4,906.

This invention relates generally to automobile tires and rims and more particularly to certain improvements applied to the tire and rim and whereby the removal of the tire from the rim is facilitated and also a sealed joint provided between the tire and rim and whereby the entrance of dirt and moisture is prevented.

With these objects in view and certain others which will become apparent as the description proceeds, the invention consists in the novel features of construction and in the manner of combining or arranging the same all of which will be fully described hereinafter and set forth in the appended claims.

In the drawings forming a part of this specification Fig. 1 is a sectional view of a tire and rim embodying one form of my invention; Fig. 2 is a sectional view taken on the line 2—2 of Fig. 1; Fig. 3 is a detail sectional view showing a slight modification; Fig. 4 is a transverse sectional view showing another form of rim and tire arranged therein; Fig. 5 is a longitudinal sectional view of the construction shown in Fig. 4; and Fig. 6 is a transverse sectional view showing a slight modification of the construction shown in Figs. 4 and 5.

Referring to the construction shown in Fig. 1, 10 indicates the tire carrying rim having a valve stem opening 11 in the base thereof and it will be noted that this opening is considerably larger than the usual or ordinary valve stem opening. 12 indicates the ordinary tire shoe and 13 the inner tube to which is connected the valve stem 14.

Where the valve stem is connected to the inner tube there is provided the usual washer 15 and in addition thereto the packing gasket 16, these parts being held in position by means of the nut 17 screwed upon the steam and binding against the gasket as most clearly shown.

The washer and gasket are of such size as to completely close the valve stem opening 11 and the gasket seats upon what may be termed the inner edge of the valve stem opening. So long as the gasket is firmly held in contact with the edge of the valve stem opening, it is obvious that no dirt or moisture can pass through the opening and in order to securely hold the gasket thus seated, I utilize the cap or sleeve 18 which is screwed upon the valve stem 14 and bears against a latch 19 pivoted at 20 to the base of the rim. This latch is notched as shown at 21 so that it can straddle or embrace the valve stem 14 and provide the proper amount of bearing or contact for the cap or sleeve 18. It is obvious that by screwing the cap or sleeve upon the stem with the end of the cap or sleeve in contact with the latch, that the stem will be drawn down and the gasket firmly pressed against the edges of the valve stem opening.

When it is desired to remove the tire from the rim, the cap or sleeve 18 is screwed down a short distance and the latch 19 turned back out of engagement with the stem and then the stem with the cap or sleeve connected thereto can be pushed upwardly through the valve stem opening, this opening being made sufficiently large for this very purpose.

Pushing the valve stem with cap thereon upwardly carries the inner tube upwardly also, and the tire being deflated, a tool can be easily introduced between the tire shoe and the rim without danger of contacting with the inner tube, inasmuch as the inner tube has been forced upwardly by pushing the valve stem with the cap therein up through the opening in the base.

It will, of course, be understood that the tire tool will be introduced at a point adjacent to where the inner tube is thus elevated.

In Fig. 3 the rim base is slightly depressed as shown at 10ª and the opening 11ª is somewhat smaller than the opening 11 but it is still large enough to permit the passage of the valve stem with the cap or sleeve 18 thereon.

In this construction, however, I eliminate the washer and gasket and bring the jam nut 17 into contact with the edges of the valve stem opening 11ª for the purpose of closing said opening. The latch 19 is exactly the same as previously described and the method of operation is exactly the same as previously described. The same advantages are also present.

In the construction shown in Figs. 4, 5 and 6, the tire carrying rim 10 is formed with a central inwardly projecting portion 10ᵇ and the valve stem opening 11ᶜ is produced in this inwardly extending portion of the rim base. This type of rim is commonly designated a drop base rim on account of the dropped or inwardly extending portion 10ᵇ. The opening 11ᶜ is preferably surrounded by the flange 10ᶜ which is formed at the same time that the opening 11ᶜ is produced.

The tire shoe 12 and inner tube 13 are of the standard type and likewise the valve stem 14.

The valve stem spreader 22, however, is slightly different from the standard valve stem spreader for in addition to the oppositely disposed wing portions 23, the spreader is carried downwardly at each end, as shown at 24, to contact with the face of the rim, as most clearly shown in Fig. 5.

The nut 17 is arranged upon the valve stem to secure the spreader in place and there are also employed the washer 15 and gasket 16, the gasket 16 coming into contact with the flange 10$^c$, as most clearly shown in Figs. 4 and 5, and the cap or sleeve 18 screwed upon the valve stem and bearing upon the latch 19 holds this gasket firmly upon the seat and effectively closes the valve stem opening 11$^c$ produced in the base of the rim. This valve stem opening is sufficiently large to permit the valve stem with cap thereon to be pushed upwardly through the opening and the tire tool can then be readily inserted between the shoe and rim and if inserted opposite the valve stem spreader, it is obvious that this spreader will protect the inner tube from injury. The valve stem being protected to a certain extent by the cap or sleeve thereon, it is obvious that this cap or sleeve will protect the threads of the valve stem against injury from the tire tools.

In the construction shown in Fig. 6 I employ a filling flange 25 which I arrange within the base of the rim and surrounding the valve stem opening 11$^d$, the upper lateral edges of this flange filler contacting with the rim base as at 26. This flange 25 is of slightly less height than the drop portion of the base of the rim and is intended to be engaged by the gasket 16 carried by the valve stem in connection with the washer 15 and nut 17. The cap or sleeve 18 is the same as previously described and likewise the latch 19.

When the cap or sleeve 18 is screwed upon the stem and bears upon the latch, the gasket will be drawn down upon the flange 25 to securely seal the opening and exclude dirt and moisture.

By the employment of this flange 25 the tire tool can be readily inserted between the rim and shoe at the point adjacent the flange 25, it being understood of course that the stem with the cap or sleeve thereon is pushed upwardly through the opening 11$^d$ and the flange 25.

It will thus be seen that I provide a simple and efficient construction whereby removal of the tire is facilitated and also an efficient closure for the valve stem opening provided excluding dirt and moisture.

Having thus described my invention, what I claim is:—

1. The combination of a rim having a valve stem hole in the base thereof, a valve stem, a sealing element carried by the valve stem and adapted to engage the rim base to seal said hole, a cap screwed on the valve stem and a member carried by the rim and adapted to be engaged by the cap to draw the sealing element to contact with the rim, said member being removable from the path of the cap without removing the latter from the valve stem.

2. The combination of a tire carrying rim having a valve stem opening, a valve stem projecting through said opening and carrying an element adapted to contact with the rim, a cap carried by the valve stem and adapted to pass through said opening with the latter, and a member carried by the rim and adapted to be removably interposed between said cap and rim and engageable by said cap to hold said element in contact with the rim and prevent movement of the valve stem in said opening.

3. The combination of a tire carrying rim having a valve stem opening, a valve stem projecting through said opening and carrying an element adapted to contact with the rim, a cap screwed on the valve stem and adapted to pass through said opening with the latter, and a latch pivotally connected with the rim and adapted to be swung to a position in which it is engageable by said cap to hold said element in contact with the rim and prevent movement of the valve stem in said opening.

4. The combination of a tire carrying rim having a valve stem opening, a valve stem projecting through said opening and carrying an element adapted to contact with the rim, a cap carried by the valve stem, said valve stem opening being large enough to permit the valve stem and the cap carried thereby to pass therethrough, and a member connected to the rim and having a slot receiving the valve stem, said member being movable to and from a position in which it is engageable by said cap to hold said element in contact with the rim and prevent movement of the valve stem in said opening.

5. The combination of a tire carrying rim having a valve stem opening, a valve stem projecting through said opening and carrying an element adapted to contact with the rim, a cap screwed on the valve stem, said valve stem opening being large enough to permit the stem and the cap carried thereby to pass therethrough, and a member pivotally connected to the rim and having a slot to receive the valve stem, said member being adapted to be swung to and from a position in which it is engageable by said cap to hold said element in contact with the rim and prevent movement of the valve stem in said opening.

In testimony whereof, I hereunto affix my signature.

JAMES H. WAGENHORST.